United States Patent [19]
Niemann

[11] 3,923,218
[45] Dec. 2, 1975

[54] CYCLE LUGGAGE CARRIER CONSTRUCTION, PARTICULARLY LIGHT-WEIGHT BICYCLE LUGGAGE CARRIER

[75] Inventor: Heinz Niemann, Herford, Germany

[73] Assignee: Firma ESGEE-Marby GmbH & Co., Bielefeld, Germany

[22] Filed: May 28, 1974

[21] Appl. No.: 473,363

[30] Foreign Application Priority Data
June 29, 1973 Germany............................ 2333245

[52] U.S. Cl................................. 224/32 A; 403/265
[51] Int. Cl.².............................................. B62J 7/04
[58] Field of Search............ 224/32 R, 32 A, 31, 37, 224/39 R; 403/187, 218, 231, 265, 266, 269

[56] References Cited
UNITED STATES PATENTS
2,290,249    7/1942    Piperoux...................... 403/269 X
3,300,110    1/1967    Zurmuhlen...................... 224/39 R
3,779,435   12/1973    Niemann........................ 224/32 A Primary Examiner—Robert G. Sheridan
Attorney, Agent, or Firm—Flynn & Frishauf

[57] ABSTRACT

To permit the use of light-weight material in the construction of a bicycle carrier, without connecting rivets, an article carrying surface is formed of a grid structure having longitudinal bars and cross rods, in which the bars and cross rods are connected together by means of a molded plastic connecting element forming a single injection molding, molded in place around the bars and the terminal ends of the cross rods, the bars and cross rods preferably being deformed from a smooth shape (circular, square, or the like) to improve holding action of the injection molding. The injection molding may be serrated, or knurled at the top surface, and formed integrally with protective plastic coverings for the bars and cross rods respectively.

13 Claims, 7 Drawing Figures

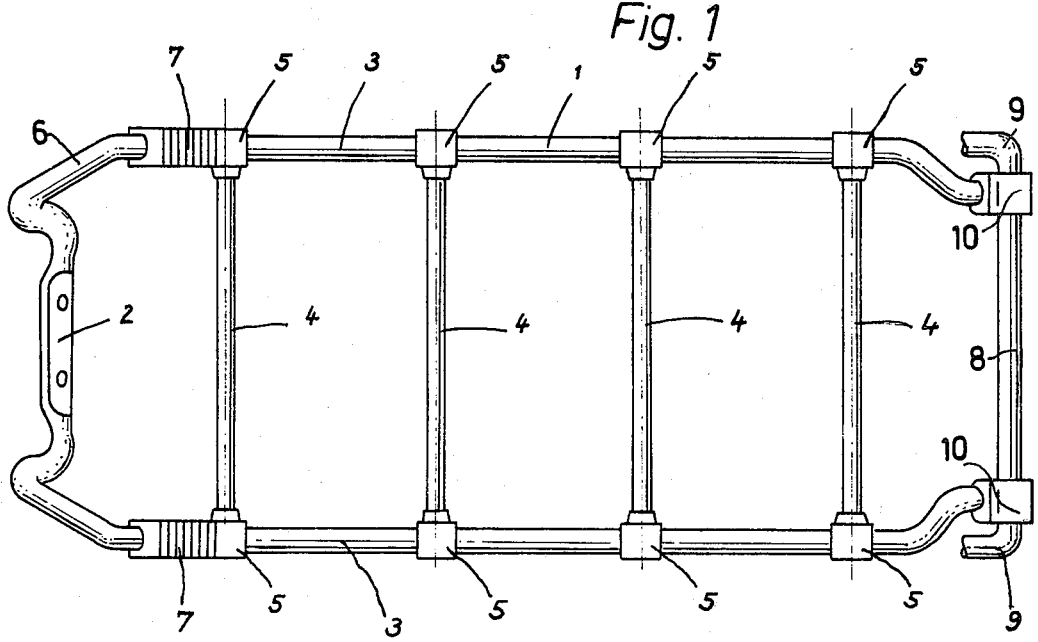
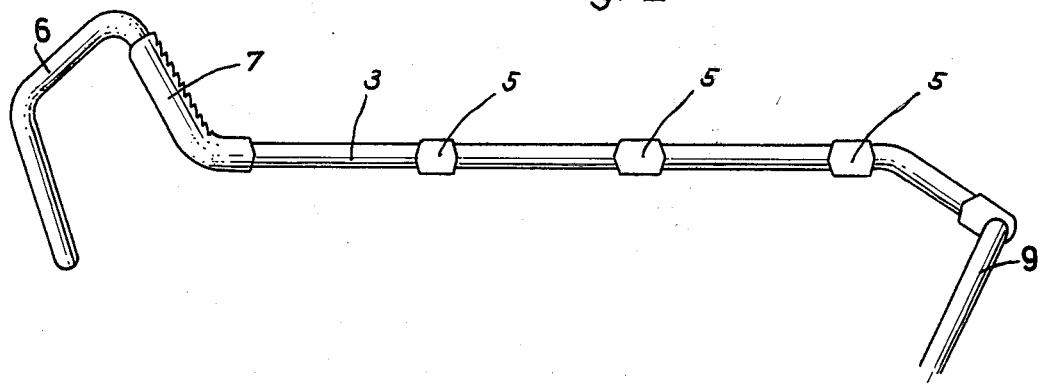
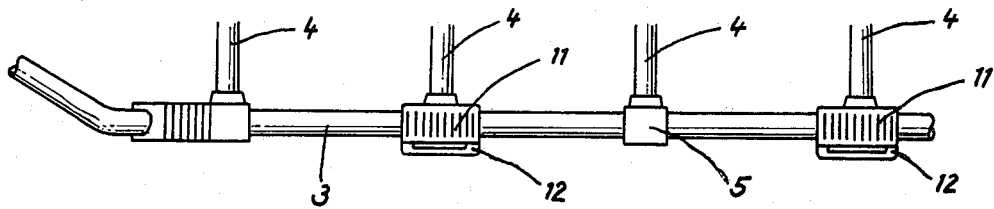

CYCLE LUGGAGE CARRIER CONSTRUCTION, PARTICULARLY LIGHT-WEIGHT BICYCLE LUGGAGE CARRIER

The present invention relates to luggage or article carriers for cycles, and more particularly to light-weight bicycle luggage carriers and the like, in which a grid structure is used to define an article carrying surface, the grid structure being secured to the frame of the bicycle at one end, the other end being connected to, or adjacent the axle of one of the wheels of the bicycle.

When bicycle or similar cycle carriers are made of light-weight material, such as aluminum alloys, then the customary welding of longitudinal holding bars and cross rods leads to difficulties, since the connection is not always reliable and secure, particularly if the structural elements are made from high-strength aluminum alloy materials. Difficulties also arise in connecting holding bars, or holding rods adapted for connection to, or adjacent the axle of one of the bicycle wheels to the cycle carrier frame. These rods should be pivotally connected to the cycle carrier frame, which requires forming an opening, or a loop in the frame and a hinge, or pivot eye, by rolling or forming of the frame members. Light-weight aluminum alloy material tends to break, so that the reject rate during manufacture is comparatively high. Further, the constant vibration to which cycle carriers are subjected in use tend to lead to metal fatigue which is particularly noticeable at the deformed ends of the cycle carrier frame, particularly when bent to form an eyelet of a small diameter.

It is an object of the present invention to provide a cycle carrier construction which can be made of any type of material, even material which is difficult to work and roll, which is inexpensive, and results in a sturdy reliable cycle carrier.

SUBJECT MATTER OF THE PRESENT INVENTION

Briefly, the cross rods and logitudinal bars forming the frame of a cycle carrier are joined by connecting the cross rods and bars by a molded plastic connecting element which is formed as a single injection molding, molded in place around the longitudinal frame bars and the terminal ends of the cross rods, forming the frame.

In accordance with a feature of the invention, the holding rods or bars connecting one end of the cycle carrier to, or adjacent the axle of one of the wheels of the cycle, are connected to the longitudinal bars of the cycle carrier by means of a single plastic injection molding connected to the free ends of the bars and surrounding a cross element of the holding rods or struts, permitting some rotation of the holding struts with respect to the cycle carrier to adjust the position of the cycle carrier, with respect to the struts, as determined by the particular construction of the cycle to which the carrier is to be attached.

The cycle carrier structure thus permits simple and reliable connection of the cross rods and longitudinal bars forming the cycle carrier, and likewise of the holding struts, by merely injection molding the connecting points of the cycle frame with suitable plastic injection material. Using plastic injection material has the further advantage that the grid structure forming the carrying surface of the cycle frame and the holding struts are electrically separated so that, if the holding struts are made of a material differing from the material used for the carrying surface, electrolytic interaction, and hence corrosion are avoided. The plastic injection molding may be made to have any suitable color, for example to be of a color matching that of a cycle, or including bright, reflecting material to further improve visibility of the cycle.

The invention will be described by way of example with reference to the accompanying drawings, wherein:

FIG. 1 is a schematic top view of a cycle carrier in accordance with the present invention;

FIG. 2 is a side view;

FIG. 3 is a fragmentary top view showing a modification;

Figure 4:
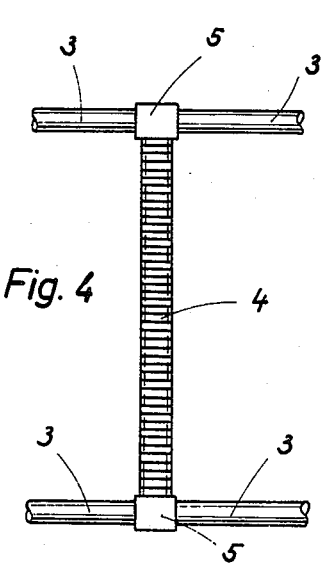
FIG. 4 is a fragmentary top view of a cross bar.

The cycle carrier (FIG. 1) is formed of a frame 1, defining an article carrying surface, which frame is adapted for connection at one end 2 thereof by means of screws (not shown) to the frame of a bicycle, for example to the rear fork of a bicycle wheel. The frame includes two longitudinal bars 3 and four cross rods, or braces 4. The cross rods 4 and the longitudinal bars 3 are connected by an injection molding 5, which is made by injection molding the adjacent regions, or zones of bars 3 and rods 4. The molding by means of plastic material is done, as customary, in a suitable mold form.

As best seen in FIG. 2, the cycle carrier is formed with a double bend 6 at the end adjacent its connection to the cycle. At the side of the double bend facing the article carrying surface, two bearing surfaces 7 are formed, made of plastic material. The bearing surfaces 7 are made as a unitary molding together with those connecting mold elements 5 which connect the next adjacent cross rod 4 with the longitudinal bars 3. The counter bearing surfaces 7, as well as the mold elements 5 are thus made by injection molding in one single suitable mold form, in one step.

The frame 1 is supported at the end opposite the end 2 by a pair of struts 9, adapted for connection at their other end at, or adjacent the axle of the wheel over which the cycle carrier is to be used. The bearings 10 for the cross element 8 of the struts 9 are likewise made of plastic injection molding elements, secured to and molded around the ends of the longitudinal frame bars 3. These bearing elements are made by injection molding the ends of the bars 3, together with the cross element 8 of the struts 9. All the injection molding steps can be carried out simultaneously, in a suitable mold form or die, having the mold elements or depressions so located that the plastic injection material will mold around the cross bars 4, the bearing surfaces 7 as well as forming the end bearings 10. By molding the cross element 8 of the two struts 9, with the struts 9 and cross element 8 previously made as a sub-assembly, the fitting for the cross element 8 in bearings 10 is automatically determined and provides for a tight, secure connection. The cross element 8, preferably, is circular. It can still be moved in the injection molding elements 10 to fit the position of the struts 9 to any given cycle without, however, resulting in a loose connection. The fit of the molding 10 around the cross strut 8, by injection molding, is tight enough to prevent rattle, or loosening of the connection when the carrier has been placed in use on a cycle.

The plastic injection molding elements 5 connecting the cross rods 4 and the longitudinal bars 3 are preferably formed, at the top surface, with a serration or knurled surface 11 (FIG. 3). The serrations contribute to secure holding of articles on the carrier, and prevent slipping. The injection moldings 5 may, at selected positions, be extended longitudinally along the bars 3 to extend the serrated surface 11. The molded plastic material may also be extended along the cross rods 4; the extension of the plastic material may be continued until the plastic materials of adjacent connecting elements 5 meet, as seen for example in FIG. 4 which shows a cross rod 4 completely covered by plastic material, formed on its top surface with a serration.

All, or selected ones of the injection molding elements 5 may be formed with an attachment eye or strap 12, molded integrally at the side (FIG. 3) to provide an elongated slot for holding straps.

Figure 5:
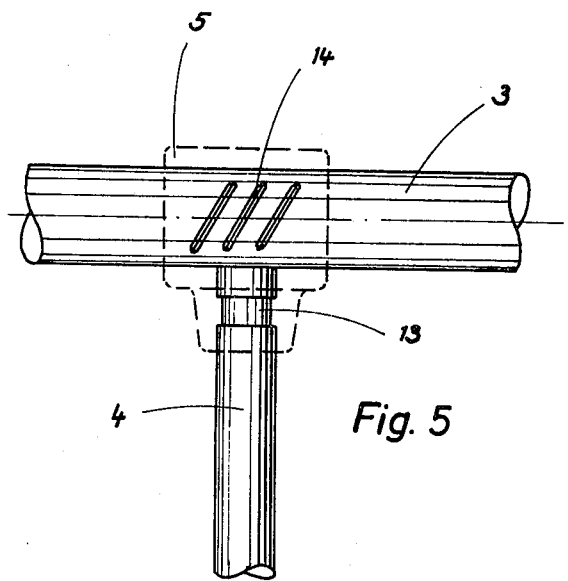
FIG. 5 is a schematic fragmentary top view, partly in phantom representation, of a connecting molding, and the connection arrangement.
Figure 6:
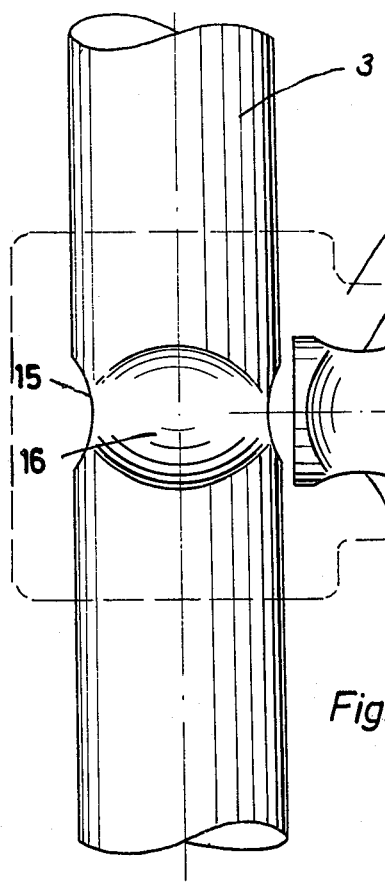
FIG. 6 is a schematic phantom top view of a modification of a connection.
Figure 7:
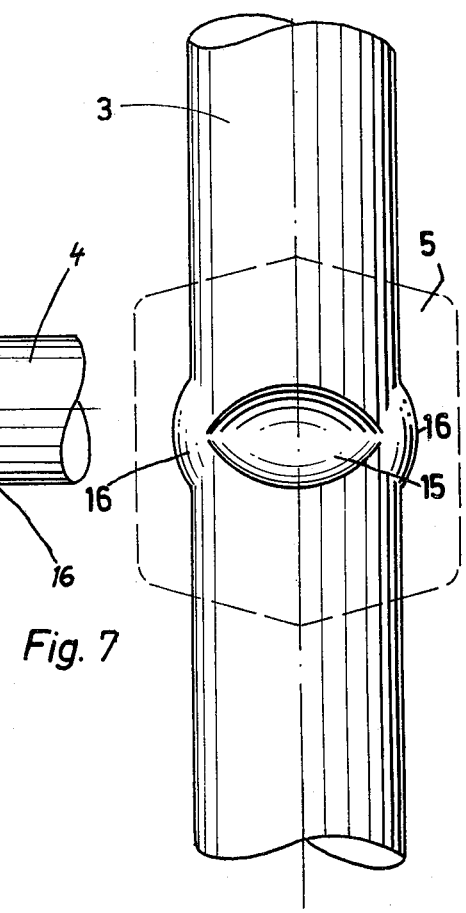
FIG. 7 is a fragmentary side view of the longitudinal bar, at the region of a connection, the view being rotated by 90° about the axis of the bar, with respect to the view of FIG. 6.

If desired, the security of connection of the cross rods 4 and the longitudinal bars 3 can be improved by deforming the cross rods, or the bars, respectively, in the region beneath the molding 5. Referring to FIG. 5, bars 3 are formed with slanting depressions or grooves 14; rods 4 are formed with a circular ring groove 13. The deformation may take any suitable shape; referring to FIGS. 6 and 7, the cross rods 4 as well as the bars 3 are deformed by a punch, providing for oval depressions 15 and corresponding oval bulges 16. As seen in FIG. 6, the connected elements need not touch each other, but may be separated by plastic injection material so that if the elements are made of different materials, electrolytic corrosion is reliably avoided in case some moisture should penetrate around the injection molding.

Various changes and modifications may be made within the scope of the inventive concept.

I claim:

1. Cycle luggage carrier construction having a grid structure defining an article carrying surface, said grid structure being formed by rod-like grid elements comprising longitudinal bar elements (3) and cross rod elements (4), characterized by molded plastic connecting elements (5) connecting and joining together the cross rod elements and respective longitudinal bar elements (3), forming a single injection molding molded, in place, around said bar elements (3) and the terminal ends of the cross rod elements (4);

and wherein the molded plastic connecting elements (5) are formed with article carrying surfaces on at least one side thereof.

2. Construction according to claim 1, wherein the plastic connecting element (5) is formed with a serrated, or knurled surface at the side forming the article carrying surface.

3. Construction according to claim 1, wherein the plastic connecting element (5) is extended longitudinally along the longitudinal bar elements (3).

4. Construction according to claim 1, wherein the connecting element (5) is extended longitudinally along the cross rods (4).

5. Construction according to claim 1, wherein adjacent plastic connecting elements on said grid structure are extended along the respective rod element and joined together to form a plastic covering for the respective element.

6. Construction according to claim 1, wherein at least one of said plastic connecting elements (5) is formed with a connecting eye (12) to permit connection of a holding strap thereto.

7. Construction according to claim 1, wherein at least one of said grid elements (3, 4) is formed with a deformation (13, 14, 15, 16) in the region beneath a molded plastic connecting element (5), said connecting element being molded around said deformation.

8. Construction according to claim 7, wherein the deformation comprises a zone of enlarged transverse dimension of the rod element.

9. Construction according to claim 1, further comprising attachment struts (8, 9) for said carrier hinged to said bars (3) and adapted for connection essentially centrally of the wheel of a cycle, characterized in that the attachment struts comprise two spaced support portions (9) and an integral connecting portion (8), and molded plastic hinge connections (10) are provided, molded around the terminal ends of the bars (3) and the integral connecting portion (8) of the struts.

10. Construction according to claim 1, wherein the carrier is formed with a re-entrant portion (6) bent upwardly from said surface, and a plastic protective element (7) is located on said portion; the improvement wherein the plastic connecting element (5) connecting the cross rod element (4) which is adjacent the upwardly bent portion (2) of the bar element (3) and said plastic protective element (7) form a single plastic injection molding.

11. Construction according to claim 1, wherein at least one of said plastic connecting element (5) molded to the longitudinal bar elements (3) wholly surrounds said bar element to space said bar element, by the material of said plastic connecting element from the cross element of said luggage carrier construction molded therewith to electrically separate said bar element from said cross rod element.

12. Construction according to claim 1, wherein the bars and rods are made of aluminum alloy material.

13. Construction according to claim 1, wherein the bars and rods are connected and joined together solely by said molded plastic connecting elements.

* * * * *

UNITED STATES PATENT AND TRADEMARK OFFICE
CERTIFICATE OF CORRECTION

PATENT NO. : 3,923,218
DATED : December 2, 1975
INVENTOR(S) : Heinz NIEMANN

It is certified that error appears in the above-identified patent and that said Letters Patent are hereby corrected as shown below:

Item 73: The name of the Assignee should be:

Firma ESGE-Marby GmbH & Co.,
Bielefeld, Germany

Signed and Sealed this thirtieth Day of March 1976

[SEAL]

Attest:

RUTH C. MASON
*Attesting Officer*

C. MARSHALL DANN
*Commissioner of Patents and Trademarks*